UNITED STATES PATENT OFFICE.

JEAN D. OLIGNY, OF MONTREAL, ASSIGNOR TO DANIEL ORMOND FRYE, OF LACHINE LOCKS, AND LOUIS GIBSON HARRIS, OF TORONTO, CANADA.

ARTIFICIAL FUEL.

SPECIFICATION forming part of Letters Patent No. 537,931, dated April 23, 1895.

Application filed October 8, 1894. Serial No. 525,241. (No specimens.)

*To all whom it may concern:*

Be it known that I, JEAN D. OLIGNY, of the city of Montreal, in the Province of Quebec and Dominion of Canada, have invented certain new and useful Improvements in Artificial Fuel; and I do hereby declare that the following is a full, clear, and exact description of the same, reference being had to the accompanying drawings, forming a part hereof.

My invention, which will be hereinafter fully set forth and claimed, relates to artificial fuel obtained from the utilization of garbage, city refuse, peat and the like.

The object of my invention is two-fold, being the manufacture of a cheap artificial fuel and at the same time the disposal and utilization of waste products, such as garbage, city refuse, sawdust, manure and the like.

I make a composition of the following ingredients well mixed together: one hundred gallons of sodius oil, ten pounds of chloride of calcium, three hundred and thirty three grams of caustic soda and one hundred and fifty grams of powdered soap; this quantity being sufficient for four tons of fuel or thereabout, more or less, according to the nature of the other materials and their state of moisture or dryness.

Sodius oil is a commercial term and the article sold under that name is prepared as follows: two thirds tar oil, one third gas oil with about five pounds of resin to each forty gallons of the mixed oil after which it goes through a process which extracts the heavier portions, leaving the lighter parts to form sodius oil.

This composition is heated and as much garbage, refuse, or other materials or all or any of them, is thrown and stirred in as will completely absorb it. Garbage containing up to sixty-five per cent. of moisture will yield good results when made into fuel with the above composition.

I claim as my invention—

1. An artificial fuel composed of garbage, refuse, or other materials in such quantity as will completely absorb a composition consisting of one hundred gallons of sodius oil ten pounds of chloride of calcium, three hundred and thirty three grams of caustic soda and one hundred and fifty grams of powdered soap or in about the proportions named, the whole yielding about four tons of fuel, substantially as set forth.

2. A composition for the preparation of artificial fuel, consisting of one hundred gallons of sodius oil, ten pounds of chloride of calcium, three hundred and thirty three grams of caustic soda and one hundred and fifty grams of powdered soap, or thereabout, substantially as set forth.

In testimony whereof I have signed in the presence of the undersigned witnesses.

JEAN D. OLIGNY.

Witnesses:
WILLIAM MCLENNAN,
G. T. JENKIN.